United States Patent
Szafraniec et al.

(12) United States Patent (10) Patent No.: US 6,813,027 B2
(45) Date of Patent: Nov. 2, 2004

(54) TIME DIFFERENCE SYNCHRONIZATION FOR DETERMINATION OF A PROPERTY OF AN OPTICAL DEVICE

(75) Inventors: Bogdan Szafraniec, Sunnyvale, CA (US); Ali Motamedi, Los Altos, CA (US); Greg Douglas Van Wiggeren, Los Gatos, CA (US)

(73) Assignee: Agilent Technologies, Inc, Palo Alto, CA (US)

( * ) Notice: Subject to any disclaimer, the term of this patent is extended or adjusted under 35 U.S.C. 154(b) by 6 days.

(21) Appl. No.: 10/046,521

(22) Filed: Jan. 14, 2002

(65) Prior Publication Data

US 2003/0133122 A1 Jul. 17, 2003

(51) Int. Cl.[7] ............................................... G01B 9/02
(52) U.S. Cl. ...................................................... 356/477
(58) Field of Search ................................ 356/73.1, 450, 356/477, 491; 250/227.19, 227.27

(56) References Cited

U.S. PATENT DOCUMENTS

| 5,202,745 A | * | 4/1993 | Sorin et al. ................. 356/73.1 |
| 5,218,418 A | * | 6/1993 | Layton ........................ 356/478 |
| 5,227,623 A | * | 7/1993 | Heffner ....................... 250/225 |
| 6,486,961 B1 | * | 11/2002 | Szfraniec et al. ........... 356/477 |

* cited by examiner

*Primary Examiner*—Samuel A. Turner
*Assistant Examiner*—Michael A. Lyons

(57) ABSTRACT

The present invention relates to determination of a property of an optical device under test, e.g. the group-delay of the optical device under test, by: tuning an optical frequency $\lambda$ of an optical beam, deriving a dependency of the optical frequency $\lambda$ of the optical beam over a first time period t, deriving a dependency of the optical property of the device under test over a second time period $t+\Delta t$, synchronizing the time dependency of the optical frequency $\lambda$ of the optical beam with the time dependency of the optical property of the device under test, and deriving the frequency dependency of the optical property of the device under test from the synchronized time dependencies.

14 Claims, 1 Drawing Sheet

TIME DIFFERENCE SYNCHRONIZATION FOR DETERMINATION OF A PROPERTY OF AN OPTICAL DEVICE

BACKGROUND OF THE INVENTION

The present invention relates to determination of a property of an optical device, e.g. the group-delay of the optical device.

In modern optical communication systems, the duration of information-carrying optical pulses is becoming increasingly short. In 40 Gb/s communication systems, the data pulses are shorter than 25 ps. Therefore, it is becoming increasingly important to measure e.g. the group-delay of optical devices with an accuracy of better than 1 ps. E.g. a heterodyne optical network analyzer has the potential to make such extremely precise and accurate measurements of a property of an optical device.

SUMMARY OF THE INVENTION

Therefore, it is an object of the invention to provide improved determination of a property of an optical device, in particular to improved determination of the group-delay of an optical device.

The object is solved by the independent claims.

Heterodyne optical network analyzers are for example used for measurements of group delay in optical components. Typically in heterodyne optical network analyzers or analyzer systems, two interferometers are involved. A tunable laser source (TLS) launches light into the two interferometers, and this light is continuously tuned from a start-frequency to a stop-frequency. One of the interferometers, the device-under-test (DUT) interferometer, measures the group delay of a DUT as a function of frequency. In order to measure this group delay, precise knowledge of the frequency tuning as a function of time is necessary. This necessary information about the time-dependence of the frequency-tuning is supplied from measurements made with the second interferometer, the reference interferometer. However, two practically unavoidable characteristics of such systems interact to create a significant limitation on the measurement precision of these devices. These two problems are nonlinear sweep of the tunable laser source and length mismatches present in the system.

For example, a problem can arise if an extra length of fiber is present before the reference interferometer and not the DUT interferometer. In this situation, an error occurs in measuring the group delay of the DUT because the group delay measurement relies on frequency-tuning rates measured with the reference interferometer. The rates measured by the reference interferometer are, because of the extra fiber length, delayed in time with respect to the actual frequency-tuning rates appropriate in the DUT interferometer. The same issue arises when the electronic delays of the photo receivers that measure the optical heterodyne signals are not identical. This situation is equivalent to a longer path leading to or from one of the interferometers than the other. In the present application the above is called an external time-delay.

A second problem can arise if the two interferometers are not symmetrical, i.e. if the free spectral range of the interferometers is different. The free-spectral range is inversely proportional to the difference in length between the two arms of an interferometer. In almost all heterodyne optical network analyzers, the two arms of an interferometer have different lengths. If the difference is not the same in both interferometers, the time-dependence of the frequency-tuning measured by the reference interferometer will not correctly describe the time-dependence of the frequency-tuning used to measure the group delay in the DUT interferometer. This type of length mismatch is unavoidable if one wishes to use the same optical setup to measure several different DUT with differing lengths. In the present application the above is called an internal time-delay.

With other words: The reason for the time delay can be internal, i.e. the reason for the delay lies within the measurement device, e.g. within one of the arms of an interferometer, used to measure the optical property, and can be external, i.e. the reason for the delay lies not within the measurement device, e.g. within one of the arms of an interferometer, used to measure the optical property, but occurs on the way of the light before entering the measurement device or after having left to measurement device.

These length mismatches become particularly detrimental when the TLS does not tune its frequency linearly. Nonlinear frequency tuning causes significant errors in the measurement when length mismatches are present.

The present invention proposes a time-delay, applied in hardware or software, to correct for the length mismatches, electronic time-delays, and nonlinear frequency tuning that ordinarily limit the accuracy of the measurement of the optical property. An advantage of the present invention is therefore improved determination of the group-delay of an optical device by applying a time-delay shift to compensate for internal and/or external time-delays to compensate e.g. for group delay errors induced by the interaction of internal and/or external time-delays caused by internal and/or external length mismatches, external time-delays caused by electronic time-delays and local oscillator nonlinear frequency sweep.

The time-delay can be derived theoretically from the setup of the analyzer system, e.g. mathematically, or can be derived in an empiric way, e.g. by testing several time-delays which are supposed to suit to an used analyzer system and by sorting out the time-delay giving the best results for this system.

The time-delay can be a constant value or at least be sufficiently approximated thereby. However, the time delay may also be dependent e.g. on the wavelength or might vary overtime. In such case the time-delay can be varied dynamically or adaptively to the system. However, in case the dependency of the time-delay (e.g. on time or wavelength) is sufficiently small, a static time-delay might be sufficient to compensate for the inherent time-delay of the system.

The time-delay can be introduced in hardware preferably by applying an electronic delay of the appropriate amount in the receiver system electronics of a heterodyne optical network analyzer. Alternatively, an extra length of fiber could preferably be applied to the path leading to one of the detectors. In software, a delay can preferably be applied numerically to the measured signals.

In conclusion, according to the present invention a time-delay, applied in hardware or software, can correct errors due to various length and electronic delay mismatches in the system and the interaction of these mismatches with nonlinear tuning of the TLS and therefore can ultimately enable the full measurement capabilities of a heterodyne optical network analyzer.

In the inventive apparatus the beam splitters can be couplers, also. The numbering of the beam splitters, i.e. first, second, third . . . beam splitter, does not necessarily imply that the splitters have to be different. Actually all or some of them can be the same, e.g. when used in an interferometer setup of Michelson type.

Other preferred embodiments are shown by the dependent claims.

It is clear that the invention can be partly embodied or supported by one or more suitable software programs, which can be stored on or otherwise provided by any kind of data carrier, and which might be executed in or by any suitable data processing unit.

BRIEF DESCRIPTION OF THE DRAWINGS

Other objects and many of the attendant advantages of the present invention will be readily appreciated and become better understood by reference to the following detailed description when considered in connection with the accompanied drawing. The components in the drawing are not necessarily to scale, emphasis instead being placed upon clearly illustrating the principles of the present invention.

DETAILED DESCRIPTION OF THE INVENTION

Figure 1:
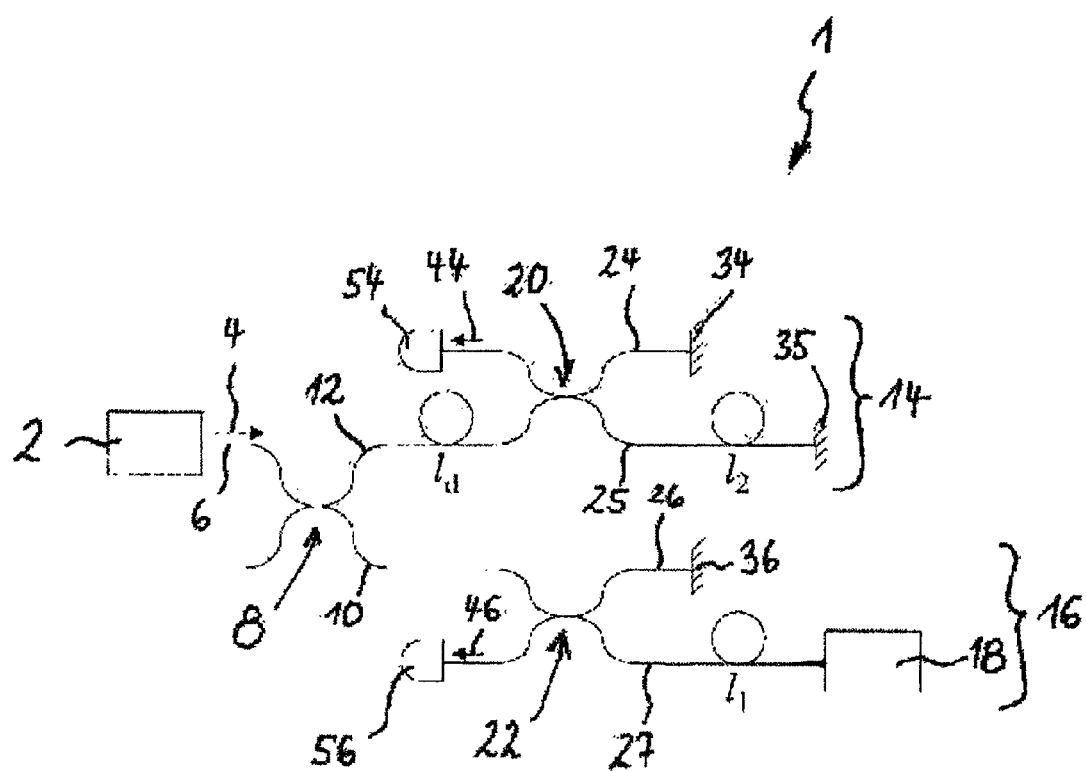
FIG. 1 shows a schematic illustration of a heterodyne optical network analyzer according to a preferred embodiment of the present invention.

Referring now in greater detail to the drawings, FIG. 1 shows a schematic illustration of a heterodyne optical network analyzer 1 according to a preferred embodiment of the present invention.

The light source for the analyzer 1 is a TLS 2. Light 4 from the TLS 2, as shown in FIG. 1, propagates in an optical fiber 6 toward a coupler 8, where it is split into two paths 10 and 12. The light transmitted along path 12 enters a reference interferometer 14, while light transmitted along the other path 10 enters a DUT interferometer 16, i e. the interferometer comprising the DUT 18. Light propagating toward the reference interferometer 14 passes through an additional length $l_d$ in path 12, that is not present in path 10 leading to the DUT interferometer 16. This represents an "external" length mismatch $l_d$ in the analyzer 1. While this external delay is depicted as an extra length of optical fiber, an external delay can also occur when electronic group delays of two photo receiver systems detecting the superimposed signals are not the same. After the light 4 propagates into either interferometer 14, 16, it is split by couplers 20 and 22 into two interfering arms 24, 25 and 26, 27, respectively. The lengths of these arms 24, 25 and 26, 27 differ, and that difference is represented in FIG. 1 by $l_1$ in the DUT interferometer 16 and $l_2$ in the reference interferometer 14. A difference between the two lengths $l_1$ and $l_2$ represents an "internal" length mismatch. The light in these arms 24, 25 and 26, 27 ultimately is reflected by mirrors 34, 35 in the reference interferometer 14 and by mirror 36 and the DUT 18 in the DUT interferometer 16 and is recombined at the couplers 20 and 22, respectively. The recombined light 44 and 46 is measured by the detectors 54 and 56, respectively.

Because arms 25 and 27 of each interferometer 14, 16 are longer than the other arms 24 and 26, respectively, the light in the longer arms 25, 27 is delayed relative to the light in the shorter arms 24, 26 as the beams recombine in the couplers 20 and 22. The time-delay of each interferometer 14, 16 is given by $$\tau_{1,2} = \frac{2nl_{1,2}}{c}, \quad (0.1)$$

where $n$ is the index of refraction of the optical fiber along the paths 6, 10, 12, 24, 25, 26, 27 and $c$ is the speed of light in vacuum. Since the two arms in Eq. (0.1) are assumed to be dispersion less, the index of refraction is not a function of optical frequency. Likewise, the length mismatch $l_2$, and therefore, $\tau_2$, are constants; they are assumed to be independent of frequency as is appropriate for reflections from mirrors. However, the length mismatch, $l_1$, is a function of frequency because its value depends on the dispersive properties of the DUT 18. The frequency dependence of $l_1(\omega)$ also results in a frequency dependence of $\tau_1(\omega)$.

To avoid measurement errors when $\tau_1 \neq \tau_2$, the TLS 2 in the heterodyne optical network analyzer 1 should generate light 4 with a continuous and linear frequency sweep. Current tunable laser technologies, however, do not permit perfect linear tuning of the laser's frequency sweep.

The radian optical frequency generated by a typical TLS 2 is written $$\omega(t)=2\pi[\nu_0+\gamma t+\chi(t)], \quad (0.2)$$

where $\nu_0$ is the optical frequency at the beginning of the sweep, $\gamma$ is the linear sweep rate, $t$ is time, and $\chi^{(t)}$ represents the nonlinear component of the sweep. With this definition and the assumption that the intensity, $I$, of the light output by the TLS 2 is constant, the intensity measured by the detector 56 in the DUT interferometer 16 can be written $$I(t+\tau_m)=2I+2I\cos(\Phi_D(t+\tau_m)), \quad (0.3)$$

where $\tau_m$ represents the time it takes for light to travel from the TLS 2 to the mirror 36 in the DUT interferometer 16 and back to the detector 56. The phase of the beat signal can be written as $$\varphi_D(t+\tau_m) = 2\pi\left[\nu_0 + \gamma t - \frac{\gamma}{2}\tau_1 + \chi\left(t - \frac{\tau_1}{2}\right)\right]\tau_1 \quad (0.4)$$

$$= \omega\left(t - \frac{\tau_1}{2}\right)\tau_1 = \omega_1\tau_1.$$

Here, the variable $\omega_1$ has been used as a shorthand notation for the frequency $\omega(t-\tau_{1/2})$.

Also, an assumption was made that the nonlinear component of the frequency sweep, $\chi^{(t)}$, varies slowly on the time scales of the order $\tau_1$. In most situations, this assumption is valid since $\tau_1$ is typically on the order of $10^{-8}$ s. The phase of the beat signal measured in the reference interferometer 14 can likewise be derived, and it is found to be $$\varphi_R(t+\tau_m+\tau_d) = 2\pi\left[\nu_0 + \gamma t - \frac{\gamma}{2}\tau_2 + \chi\left(t - \frac{\tau_2}{2}\right)\right]\tau_2 \quad (0.5)$$

$$= \omega\left(t - \frac{\tau_2}{2}\right)\tau_2.$$

The time-delay $\tau_d$ is included in Eq. (0.5) to account for the "external" delay incurred by the additional length $l_d$ of fiber along the path 12 leading to the reference interferometer 14. Experimentally, however, the phase of the reference interferometer 14 is actually measured at the same times as the phase of the DUT interferometer 16. Consequently, it is helpful to make a change of variables such that Eq. (0.5) becomes $$\Phi_R(t+\tau_m)=\omega(t-\tau_2/2-\tau_d)\tau_2=\omega_2\tau_2. \quad (0.6)$$

Here, as above for $\omega_1$, the variable $\omega_2$ denotes the radian optical frequency emitted from the TLS 2 at a time $t-\tau_2/2-\tau_d$.

One of the principle measurements of the shown heterodyne network analyzer 1 is the measurement of the group delay of the DUT 18. However, other optical properties of the DUT 18 can be measured, also. The group delay of DUT 18 over the range of frequencies swept by the TLS 2 can be obtained from the evolution of $\Phi_R$ and $\Phi_D$. The group delay is actually defined to be $$\tau_g(\omega) = \tau_1 + \omega \frac{d\tau_1}{d\omega}. \quad (0.7)$$

Clearly then, $$\tau_g(\omega_1) = \frac{d\varphi_D}{d\omega_1}. \quad (0.8)$$

Because $\Phi_D$ is experimentally measured as a function of time rather than frequency, it is difficult to evaluate Eq. (0.8) directly using the measured data. The evolution of $\omega_1$ is inextricable from the evolution of the phase $\Phi_D$ since $\tau_1$ varies with optical frequency. The evolution of the reference interferometer, however, enables us to know the evolution of $\Phi_2$, which is simply equal to $\Phi_R/\tau_2$ because $\tau_2$ is a constant. This knowledge of the evolution of $\omega_2$ ultimately enables a precise evaluation of Eq. (0.8). It is important to note, however, that $$\tau_g(\omega_2) \neq \frac{d\varphi_D}{d\omega_2}. \quad (0.9)$$

To illustrate this more fully, we rewrite $\Phi_D$ in terms of $\omega_2$, such that $$\varphi_D(t+\tau_m) = \quad (0.10)$$
$$[\omega_2 + 2\pi(\frac{\gamma}{2}(2\tau_d + \tau_2 - \tau_1) + \chi(t - \frac{\tau_2}{2} - \tau_d) - \chi(t - \frac{\tau_1}{2}))]\tau_1$$

Performing the differentiation of $\Phi_D$ with respect to $\omega_2$ leads to $$\frac{d\varphi_D}{d\omega_2} = \tau_1 + \omega_2 \frac{d\tau_1}{d\omega_2} + 2\pi(\tau_d + \frac{\tau_2}{2} - \frac{\tau_1}{2})\left(\frac{d^2\chi(t)}{dt^2}\right)\left(\frac{dt}{d\omega_2}\right)\tau_1 + \quad (0.11)$$
$$2\pi(\tau_d + \frac{\tau_2}{2} - \tau_1)\left(\gamma + \frac{d\chi(t)}{dt}\right)\left(\frac{d\tau_1}{d\omega_2}\right).$$

Clearly, this is not the group delay $\tau_g(\omega_2)$. The last two terms are error terms. Under typical experimental parameters, the second of these terms is negligible. However, the first term can indeed induce significant errors.

These errors can be eliminated, however, by applying a time-delay to the data to compensate simultaneously for "internal" and "external" delays. The proper time-delay is equivalent to a change of variables in Eq. (0.6), where $$t \to t + \frac{1}{2}(\tau_2 - \tau_1) + \tau_d.$$

Thus, $\omega_2 \to \omega_1$, and the data gained with the detector 54 of reference interferometer 14 can be used to evaluate Eq. (0.8) correctly.

What is claimed is:

1. A method of determination of an optical property of an optical device under test comprising:

splitting an incoming light beam into a first initial light beam and a second initial light beam;

splitting said first initial light beam into a first light beam and a second light beam;

coupling the first light beam into the optical device under test;

letting the second light beam travel a different path from the first light beam;

superimposing the first and the second light beam to produce interference between the first light beam and the second light beam in a resulting first superimposed light beam;

detecting the power of the first superimposed light beam for deriving a first signal over time containing information about the optical property of the device under test when tuning a frequency of the incoming light beam over a given frequency range;

splitting the second initial light beam into a third light beam and a fourth light beam;

superimposing the third and the fourth light beam after the third and fourth light beams have traveled a different path, to produce interference between the third and the fourth light beam in a resulting second superimposed light beam;

detecting the power of the resulting second superimposed light beam for deriving a second signal over time containing information about a time dependence of a frequency when tuning a frequency of the incoming light over a given frequency range;

compensating a time-delay between the first and the second signal; and deriving a frequency dependency of the first signal for deriving the optical property of the optical device under test.

2. The method of claim 1, further comprising:

deriving elements of a Jones matrix for the optical device under test from the compensated frequency dependence of the detected powers.

3. The method of claim 1, further comprising at least one of:

using a first light beam with defined polarization, detecting the power of the resulting first superimposed light beam as a function of frequency and polarization, and deriving a polarization mode dispersion of the device under test from the information obtained through the measurement, preferably represented as Jones matrix elements of the device under test;

deriving a chromatic dispersion of the device under test from the Jones matrix elements of the device under test;

using said first light beam with defined polarization, detecting the power of the resulting first superimposed light beam as a function of frequency and polarization, and deriving the principal states of polarization of the device under test from the Jones matrix elements of the device under test;

using said first light beam with defined polarization, detecting the power of the resulting first superimposed light beam as a function of frequency and polarization, and deriving the polarization dependent loss of the device under test from the Jones matrix elements of the device under test;

using said first light beam with defined polarization, detecting the power of the resulting first superimposed light beam as a function of frequency and polarization, and deriving the fast and slow group delays, associated with the fast and slow principal states of polarization of the device under test from the Jones matrix elements of the device under test;

deriving the insertion loss of the device under test from the Jones matrix elements of the device under test;

deriving a transmissivity of reflectivity of the device under test from the Jones matrix elements of the device under test; and using a first light beam with defined polarization, detecting the power of the resulting first superimposed light beam as a function of optical frequency and polarization, and deriving higher-order polarization mode dispersion parameters from the Jones matrix elements of the device under test.

4. The method of claim 3, wherein the higher-order polarization mode dispersion parameters include the rate of change of the differential group delay with frequency.

5. The method of claim 1, further comprising:

choosing the time-delay to be $\frac{1}{2}(\tau_2-\tau_1)+\tau_d$, $\tau_2$ being the delay of the fourth light beam relative to the third light beam, $\tau 1$ being the delay of the first light beam relative to the second light beam, ($\tau 2 - \tau 1$) being an internal delay, and $\tau d$ being an external delay.

6. A software program or product for executing a method when run on a data processing system, said method comprising:

splitting an incoming light beam into a first initial light beam and a second initial light beam;

splitting said first initial light beam into a first light beam and a second light beam;

coupling the first light beam into the optical device under test;

letting the second light beam travel a different path from the first light beam;

superimposing the first and the second light beam to produce interference between the first light beam and the second light beam in a resulting first superimposed light beam;

detecting the power of the first superimposed light beam for deriving a first signal over time containing information about the optical property of the device under test when tuning a frequency of the incoming light beam over a given frequency range;

splitting the second initial light beam into a third light beam and a fourth light beam;

superimposing the third and the fourth light beam after the third and fourth light beams have traveled a different path, to produce interference between the third and the fourth light beam in a resulting second superimposed light beam;

detecting the power of the resulting second superimposed light beam for deriving a second signal over time containing information about a time dependence of a frequency when timing a frequency of the incoming light over a given frequency range;

compensating a time-delay between the first and the second signal; and deriving a frequency dependency of the first signal for deriving the optical property of the optical device under test.

7. The method claim 6, wherein the software program or product is stored on a data carrier.

8. An apparatus for determination of a property of an optical device under test comprising:

a beam splitter in the path of the incoming light beam for splitting the incoming light beam into a first initial light beam traveling a first initial path and a second initial light beam traveling a second initial path;

a beam splitter in the path of the first initial light beam for splitting the first initial light beam into a first light beam traveling a first path and a second light beam traveling a second path, wherein the optical device under test can be coupled in said first path for coupling in the first light beam;

a recombiner in said first path and in said second path for superimposing the first and the second light beam after the second light beam has traveled a different path as the first light beam to produce interference between the first light beam and the second light beam in a resulting first superimposed light beam traveling a first resulting path;

a first power detector in said first resulting path for detecting, and providing a first signal representing, the power of the resulting first superimposed light beam traveling the first resulting path as a function of frequency when timing the frequency of the incoming light beam over a given frequency range;

a beam splitter in said second initial path for splitting the second initial light beam in a third light beam traveling a third path and a fourth light beam traveling a fourth path;

a recombiner in said third and said fourth path for superimposing the third and the fourth light beam after said third and fourth light beam have traveled a different path, to produce interference between the third and the fourth light beam in a resulting second superimposed light beam traveling a second resulting path;

a second power detector in said second resulting path for detecting, and providing a second signal representing, the power of the resulting second superimposed light beam as a function of frequency when tuning the frequency of the incoming light beam over a given frequency range; and an evaluation unit that:

detects a time dependence in a tuning gradient of the frequency when tuning the frequency of the incoming light beam over the given frequency range, uses a time-delay for compensating an external and/or an internal time-delay between the first signal and the second signal, derives a frequency dependency of the first signal, and derives an optical property of the optical device under test from the frequency dependency of the first signal.

9. The apparatus of claim 8, wherein the optical device under test is a heterodyne optical network analyzer.

10. A method of determination of an optical property of an optical device under test comprising:

tuning an optical frequency $\lambda$ of an optical beam;

deriving a dependency of the optical frequency $\lambda$ of the optical beam over a first time period t;

deriving a dependency of the optical property of the device under test over a second time period $t+\Delta t$;

synchronizing the time dependency of the optical frequency $\lambda$ of the optical beam with a time dependency of the optical property of the device under test; and deriving the frequency dependency of the optical property of the device under test from the synchronized time dependencies.

11. The method of claim 10, wherein deriving a dependency of the optical frequency λ and deriving a dependency of the optical property of the device under test are performed with the use of at least one interferometer.

12. The method of claim 10, wherein synchronizing the time dependency of the optical frequency λ of the optical beam with a time dependency of the optical property of the device under test is performed by using a time-delay to synchronize the time dependency of the optical frequency λ of the optical beam with the time dependency of the optical property of the device under test.

13. The method of claim 10, wherein the synchronization is dynamic or static.

14. A method of determination of an optical property of an optical device under test comprising:

tuning a frequency of an incoming light beam over a given frequency range;

splitting the incoming light beam into a first initial light beam and a second initial light beam;

splitting said first initial light beam into a first light beam and a second light beam;

coupling the first light beam into the optical device under test;

letting the second light beam travel a different path from the first light beam;

superimposing the first and the second light beam to produce interference between the first light beam and the second light beam in a resulting first superimposed light beam;

detecting the power of the first superimposed light beam for deriving a first signal over time containing information about the optical property of the device under test;

splitting the second initial light beam into a third light beam and a fourth light beam;

superimposing the third and the fourth light beam after said third and fourth light beams have traveled a different path, to produce interference between the third and the fourth light beam in a resulting second superimposed light beam;

detecting the power, of the resulting second superimposed light beam for deriving a second signal over time containing information about the time dependence of the frequency;

compensating a time-delay between the first and the second signal; and deriving a frequency dependency of the first signal for deriving the optical property of the optical device under test.

* * * * *